Sept. 25, 1928.
L. C. BLOMSTROM
1,685,224
HOLDING BLOCK FOR BROACHING HALF BEARINGS
Filed July 18, 1927
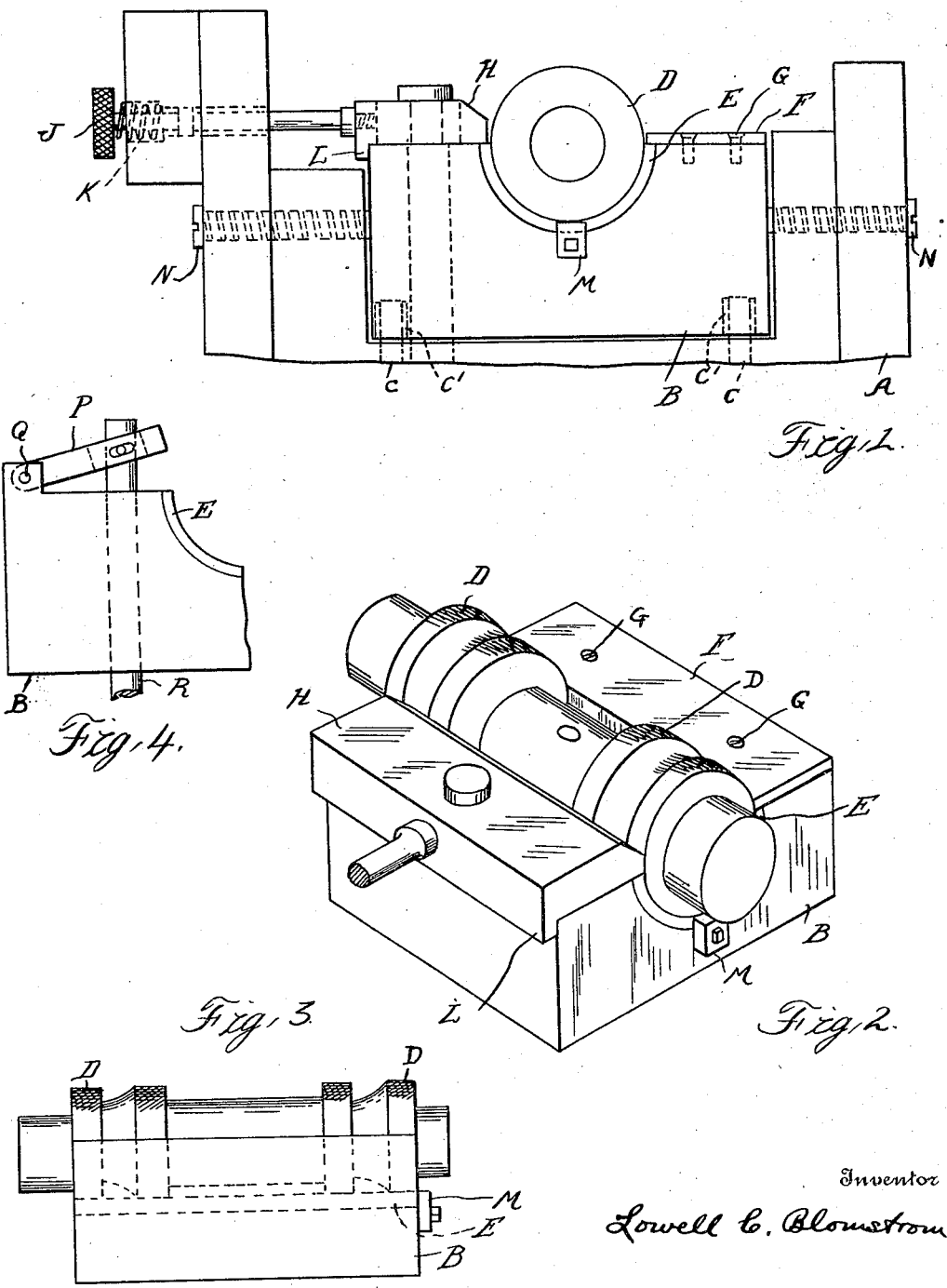
Inventor
Lowell C. Blomstrom
By Sevan Frye and Murray
Attorneys Patented Sept. 25, 1928.

1,685,224

UNITED STATES PATENT OFFICE.

LOWELL C. BLOMSTROM, OF DETROIT, MICHIGAN, ASSIGNOR TO FEDERAL MOGUL CORPORATION, OF DETROIT, MICHIGAN, A CORPORATION OF MICHIGAN.

HOLDING BLOCK FOR BROACHING HALF BEARINGS.

Application filed July 18, 1927. Serial No. 206,524.

This invention relates to an improved means for holding a split shell or half bearing in position for action upon it by a broaching tool, and has for its object the firm and accurate positioning of the bearing relatively to the path of travel of the broaching tool, and at the same time easy and quick substitution of one bearing shell for another as each successive broaching operation is completed. The bearing shells in question are those which have been previously lined or surfaced on their concave sides with babbitt or similarly soft material relatively to the hardened steel used in the broaching tools, and generally speaking the broaching operation is performed after the half bearing has been ground on the outside and bored or reamed on the inside.

In the drawings:

Figure 1 is an end elevational view of the holding block equipped with my improved clamping means, and showing as well a half bearing in position therein and the broach in operative position relatively thereto.

Figure 2 is a perspective of the block, the half bearing and the broaching tool.

Figure 3 is a side elevational view showing the half bearing in phantomed-in position relatively to the block and to the broaching tool.

Figure 4 is a fragmentary view of a slightly modified form of movable locking member and of the adjacent part of its supporting block.

A represents a table or holding frame, in which the block B is held against axially lengthwise movement by the bolts C or equivalent means. When the apparatus is set up, the positioning of this block relatively to the path of travel of the broaching tool D is made a matter of great care and accurate adjustment as by manipulation of flanking or lateral adjustment screws N on either side, so that as the broaching tool proceeds lengthwise of the block, the half bearing E, which lies within the recessed or troughed center portion of the block, will be acted upon to just the degree, generally a matter of minute thousandths of an inch, required as to it babbitt lining. The holes C' in the body of the block B, in which the screws C engage, are preferably made slightly elliptical in shape, with the cross-sectionally long axis extending transversely of the axis of the holding block B, in order to make possible this relatively slight screw-actuated adjustment of the block crosswise of the frame A, while preventing relative lengthwise movement thereof. Along one top edge of the block is positioned the plate F, either made integral with the body of the block, or originally separate and attached thereto by screws or bolts G, with its inner edge projecting over the central troughed space in the block sufficiently to act as a stop for one of the straight edges of the half bearing E when inserted in the troughed portion of the block. The insertion and removability of a half bearing from this position is of course easy so long as its other straight edge is not overengaged by the sliding stop or plate H, which is similarly positioned on the other side of the block B. This plate H is made slidable with reference to the block B sufficiently so that when it is retracted by pull upon the handle J, against the draw of the spring K, its interior edge clears the outer line of the inserted half bearing E; but when the handle or knob J is released, it is thrown inwardly relatively to the block sufficiently to overengage the adjacent straight edge of the half bearing E, but its inward projection to an undesired degree, that is, to such an extent that it would strike the broaching tool D, is prevented by the engagement of the depending lip L against the side of the block. The method of use of this device is thus apparent. When the slide plate H is drawn outwardly, a half bearing is slipped into position and the slide plate H allowed to move to its holding position with reference to the half bearing, which, due to the described action of the slide plate H and the fixed plate F is thus held against rocking motion within the block, so that an accurate broaching operation by the tool D can be performed. The possible lengthwise slipping of the bearing E within the block is prevented by the presence of the stop M, which abuts in front of the forward edge of the bearing E. Thus to all intents and purposes as regards possible slippage during the broaching operation, the bearing E is made an integral part of the block B, whose previous accurate positioning relatively to the path of travel of the broaching tool D has already been emphasized.

While it has been my experience that the slide plate H is the most satisfactory form of movable holding medium, for cooperation with the fixed overengaging shelf or plate F, I desire it to be understood to be within the fair and intended scope of this disclosure to employ some such alternative construction as I have illustrated in Figure 4, wherein the part P, corresponding in function to the slide plate H, is pivoted, as at Q, and when swung down to holding position relatively to the block and to the half bearing is temporarily locked in position by some such means as the link R.

What I claim is:

1. Means for holding a half bearing in position for broaching, comprising, in combination with a base block provided with a seat of suitable contour, a fixed shelf projecting over one lateral edge of the bearing seat, under which one edge of the half bearing is adapted to be slipped when the latter is first placed in its seat, and a slidable holding piece adapted to be moved transversely of the axis of the half bearing for accurate engagement over the upturned opposite edge of the latter.

2. A holding block for a half bearing during broaching, comprising a semicircularly recessed seat overengaged on one edge by an inwardly projecting shelf, and a slide piece adapted to similarly overengage the other edge after the half bearing has been seated therein, the retracted position of said slide piece while the half bearing is being seated and removed respectively being over that portion of the side of the block outside the recessed portion.

3. A holding block for a half bearing whose broaching is intended, having a central seat portion of complementary semi-circular contour to that of the half bearing, an inwardly projecting shelf overengaging one straight edge of the bearing when seated, and a transversely movable slide piece adapted to be placed in position of holding overengagement relatively to the other straight edge of the bearing, both the shelf and the slide piece being clear of the line of travel of the broaching element as it operates upon the half bearing.

4. In combination with a suitably contoured base block adapted to be placed in axial alignment with a broaching tool, means for rigidly holding a half bearing in position therein, comprising a shelf under which one edge of the half bearing is adapted to be forced when the latter is seated in the base block, and a transversely movable slide adapted to be moved into holding engagement over the other edge of the half bearing from that engaged by the fixed shelf, though out of line with the path of travel of the broaching tool as it moves axially lengthwise of the half bearing.

5. Means for holding a half bearing in position for broaching, comprising a longitudinally troughed base block, a fixed holding element on one side thereof for overengaging one straight edge of a half bearing positioned within the trough, and a transversely movable holding member adapted to be moved into and out of position of overengagement relatively to the other straight edge of the half bearing.

6. A holding block for a half bearing during broaching, having a longitudinally troughed central portion of complementary contour to that of the half bearing, a plurality of fixed stop elements carried by said holding block, one adapted to resist lengthwise movement of the half bearing relatively to the block and the other adapted to resist its rocking movement, and a movable holding plate adapted to be moved into and out of overengaging position relatively to the other straight edge of the half bearing, thereby cooperating with the latter of said fixed holding means in preventing rocking movement of the half bearing during the broaching operation.

7. In combination with a frame and a broaching tool adapted to operate thereover, a holding block for a half bearing whose broaching is desired, adapted to be accurately positioned relatively to the path of travel of the broaching tool, said holding block being centrally grooved for the reception of the half bearing and said groove being flanked and marginally overengaged on one side by a fixed shelf and on the other side by a movable holding piece, each adapted to engage the adjacent straight edge of the half bearing to hold it against rocking during the broaching operation.

In testimony whereof I sign this specification.

LOWELL C. BLOMSTROM.